Sept. 19, 1950   E. B. HEDGPETH   2,523,211
DOLLY COUPLER FOR AUTOMOTIVE VEHICLES
Filed Oct. 28, 1947

Inventor:
EDWARD B. HEDGPETH,
Attorneys.

Patented Sept. 19, 1950

2,523,211

UNITED STATES PATENT OFFICE 2,523,211

DOLLY COUPLER FOR AUTOMOTIVE VEHICLES

Edward B. Hedgpeth, Salt Lake City, Utah

Application October 28, 1947, Serial No. 782,505

10 Claims. (Cl. 280—33.44)

This invention relates to a dolly coupler for automotive vehicles, the principal object thereof being to provide a trailer dolly that is simple, compact, and highly articulative.

Important objects include the following, namely:

To steer easily;

To eliminate swaying and weaving on the road;

To be highly maneuverable;

To eliminate the danger of jack-knifing when backing.

Other objects will become obvious after perusing the accompanying description.

The extensive use of trailers that are removably coupled to automotive units has brought to the notice of automobile drivers a number of defects that are common in the general run of coupling equipment. The device of the invention overcomes the defects inherent in existing devices, to an appreciable extent.

Accordingly, there is provided a caster-wheel dolly that ordinarily carries the major part of the tongue weight of a trailer, this device at the same time being adjustable to impose a suitable proportion of the tongue weight upon the traction wheels of the automotive unit without impairing the high degree of flexibility that is inherent in the device as a whole.

A feature of the invention is a duplex universal joint arrangement wherein the two joints are spaced quite closely together, one joint being fixed relatively to the trailer tongue while the other joint is supported in a vertically floating draft yoke, the two being under adjustable spring tension relatively to each other. The duplex joint, being compact and held positively in alignment, gives no chance for jack-knifing when backing and makes backing perfectly safe even for inexperienced drivers.

Compactness is achieved by making the draft yoke in the shape of a V, the legs of which straddle the usual V-shaped trailer tongue, so that normally both V's lie in substantially a common plane. The draft yoke is pivoted at the spread extremities of its straddling legs, so that it is allowed to oscillate vertically, thereby effecting the floating action.

Figure 1:
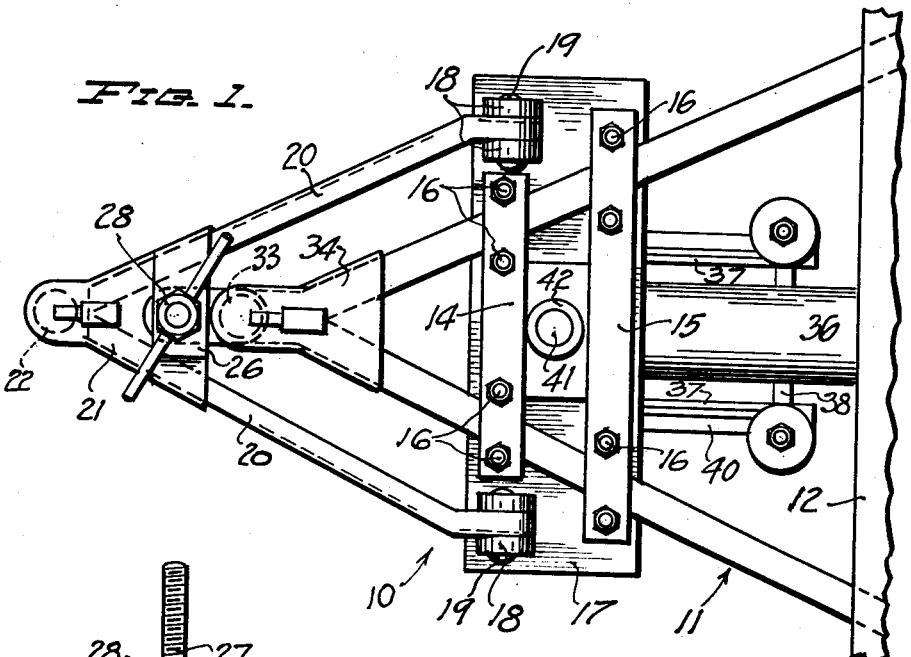
Figure 2:
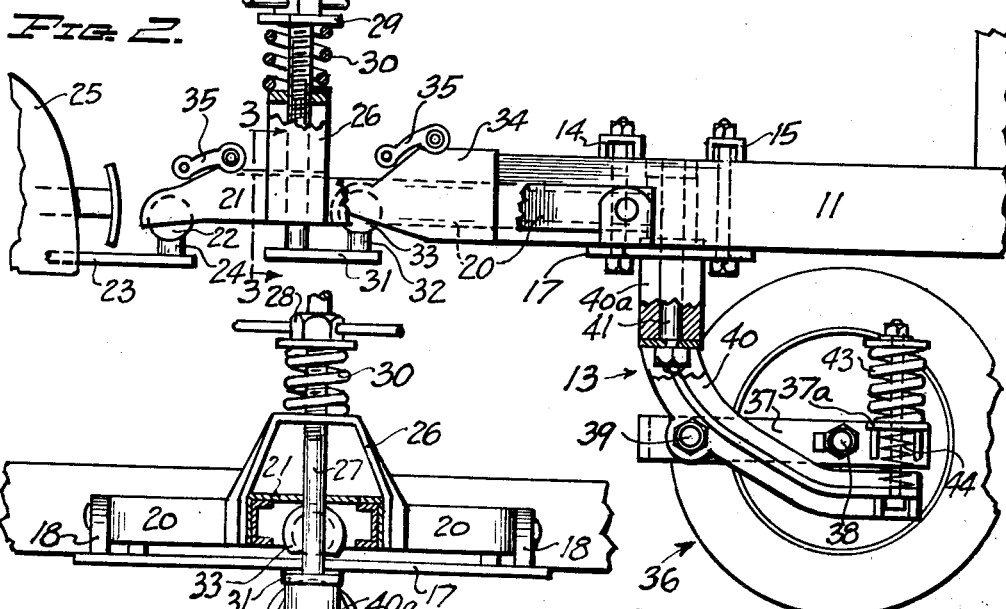
Figure 3:
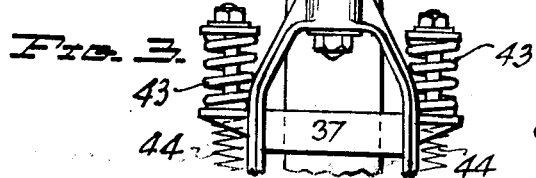

In the acompanying drawing which illustrates one embodiment of the invention,

Fig. 1 represents a plan;

Fig. 2 a side elevation, some parts being partially in section and other parts being broken away; and, Fig. 3, a front elevation, partially in vertical section, the section being taken on the line 3—3 in Fig. 2.

Referring to the drawing, the numeral 10 denotes the device of the invention as applied to the tongue 11 of a trailer 12. As shown, the equipment includes a caster wheel assembly 13. In this instance the device of the invention is easily attached to or removed from the tongue 11 by means of clamping pieces 14 and 15 that preferably extend across the top of the tongue 11. The clamping pieces are provided with bolts 16 that depend through a plate 17, the latter spanning the branches of the tongue, the bolts 16 serving to securely hold the assemblage in alignment. The plate 17 projects beyond the tongue on both sides and carries hinge lugs 18 that are fast on the plate 17. Hinged in the lugs 18 by means of pins 19 is a draft yoke 20, which at its forward end carries a universal joint coupling device 21 of any suitable or usual kind, this being fastened to the yoke 20, for example, by welding. The coupling device 21 is arranged to engage a ball 22 that is fast on a bar 23 by means of a rigid stem 24, the bar 23 being fastened to the chassis of an automotive vehicle 25 in any desired manner.

Rigidly secured near the forward part of the draft yoke 20 is a support 26, preferably arched, through which extends an adjusting screw 27 that is threaded in a handnut 28, the latter bearing on a washer 29 which in turn rests on a compression spring 30 so that the spring reacts between the washer 29 and the top of the support 26, such structure providing a bearing elevated relative to the plane of the V-yoke 20. The adjusting screw 27 has a foot 31 that projects inwardly and has fastened to it a stem 32 which carries a ball 33 arranged for engagement by a cooperating coupling device 34, this being similar to the aforementioned coupling device 21. The two coupling devices are manipulated manually by means of the respective operating levers 35.

The spring caster assembly 13 forms the subject of my separate application for patent, bearing even date herewith and having the Serial Number 782,506. This caster assembly is particularly advantageous for use in connection with the present invention for the reason that the wheel 36 is sufficiently small in diameter to clear the bottom plane of the trailer tongue 11, as shown in Fig. 2, when the wheel swings about the vertical axis of oscillation in usual caster fashion. The caster assembly has the frame 37 in which the wheel 36 is carried by means of an axle pin 38, the frame 37 at the same time being pivoted at 39 in a fork 40. The fork has a shank 40a that is swiveled on a kingpin 41 secured in a hub 42 which in turn is rigidly secured to the plate 17.

Articulation vertically, between the frame 37 and the fork 40, is regulated by means of springs 43 that bear on the respective brackets 37a which preferably form rigid parts of the frame 37. If desired, springs 44 may be disposed between the brackets 37a and the lower extremities of the branches of the fork 40, as indicated in Fig. 2.

The invention presents a unique feature in that the coupling unit 21 is brought into extremely close proximity with the ball 33 of the coupling unit 34, this being made possible by the angular spread of the legs of the draft yoke 20 whereby the tongue 11 of the trailer is accommodated largely within the said spread. This also provides for locating the pivotal points of the draft yoke 20 in such relation with the caster assembly, that in operation, the trailer tongue load can be equably proportioned between its bearing on the ball 22 and its bearing on the caster assembly for different running conditions. This brings about automatically a beneficial flexibility because of the resulting necessary cooperation between the spring 30 on one hand and the springs 43 on the other.

Furthermore, since the draft yoke 20 and the tongue 11 are virtually rigid with relation to each other along the common horizontal plane, it follows that jack-knifing between the automotive unit 25 and the trailer 12 is effectually prevented.

The arrangement of the bolts 16 makes the attachment of the dolly to the tongue 11 remarkably safe because the clamping power alone of these bolts is not relied upon for security of the removable fastening. This is because, even if the bolts on the inner sides of the two inclined branches of the tongue should accidentally be loose, they nevertheless are wedged against these inner sides when the automotive unit is pulling. Similarly, should the bolts on the outer sides of the two inclined branches be accidentally loose, these bolts are wedged to a bearing against the said outer sides when the automotive unit is backing. In spite of this safety feature, the bolts 16 afford a convenient and quick means of attaching or detaching the dolly, as the case may be.

Irrespective of the fact that the specific details of construction are necessarily shown and described by way of illustration in the foregoing disclosure, the only limitations in construction are those imposed by the terms of the following claims.

The invention having been fully described, what is claimed is:

1. A dolly coupled, comprising a V-yoke; an attaching device at substantially the vertex of the V-yoke; another attaching device spaced inwardly of and in close proximity to said vertex; a vertically adjustable support for the second-mentioned attaching device, said adjustable support being connected to said V-yoke and said second-mentioned attaching device being connected solely to said adjustable support; and an attaching assembly whereby the spread extremities of said V-yoke may be attached to the tongue of a trailing vehicle so that the outer extremity of said tongue comes into registry with the second-mentioned attaching device.

2. A dolly coupler according to claim 1, wherein the vertically adjustable support for the second mentioned attaching device comprises a bearing elevated relative to the plane of the V-yoke; a rod depending adjustably from said elevated bearing; and means whereby the second-mentioned attaching device is fixed on the depending portion of said rod.

3. A dolly coupler according to claim 2, wherein compression spring means is interposed between the elevated bearing and the depending rod to carry said depending rod on said bearing.

4. A dolly coupler, comprising a V-yoke; an attaching device at substantially the vertex of the V-yoke; another attaching device spaced inwardly of and in close proximity to said vertex; a vertically adjustable support for the second-mentioned attaching device, said adjustable support comprising a bearing connected to and elevated relative to the plane of the V-yoke, a rod depending adjustably from said elevated bearing, and a foot projecting transversely from said rod, said second-mentioned attaching device being fastened on and connected solely to said foot in spaced relation to said rod; and an attaching assembly whereby the spread extremities of said V-yoke may be attached to the tongue of a trailing vehicle so that the outer extremity of said tongue comes into registry with the second-mentioned attaching device.

5. A dolly coupler according to claim 1, wherein said attaching assembly comprises a member removably clamped to said tongue of a trailing vehicle; spaced apart lugs fixed on said removably clamped member; and hinge means connecting said spread extremities of the V-yoke to said lugs.

6. A dolly coupler according to claim 5, wherein the tongue of said trailing vehicle is of V-form; wherein said removably clamped member comprises a plate spanning the V-form transversely thereof; and wherein pairs of fastening members are spaced apart along the legs of the V-tongue, each of said pairs being astride of the respective one of said legs and engaging said spanning plate.

7. The combination recited in claim 1 wherein the adjustable support is resiliently connected to the V-yoke.

8. A dolly coupler, comprising a yoke frame; an attaching device at one end of said yoke for attachment to an automotive vehicle; a clamping assembly at the opposite end of said yoke frame for clamping attachment to the tongue of a trailer intermediate the length of said tongue, said clamping assembly being pivoted to said yoke frame for oscillation in a vertical plane; and a second attaching device secured solely to said yoke frame intermediate the said ends thereof, said second attaching device being arranged for engagement by the terminal portion of said trailer tongue.

9. The combination recited in claim 8, wherein the second attaching device is secured to a post anchored to the yoke frame for vertical adjustment relative thereto.

10. The combination recited in claim 9, wherein resilient means are interposed between the post and the post anchorage.

EDWARD B. HEDGPETH.

REFERENCES CITED

The following references are of record in the file of this patent:

UNITED STATES PATENTS

| Number | Name | Date |
|---|---|---|
| 2,331,006 | Suttles | Oct. 5, 1943 |
| 2,344,091 | McDaniel | Mar. 21, 1944 |
| 2,350,624 | McDaniel | June 6, 1944 |
| 2,376,001 | Nogle | May 15, 1945 |
| 2,410,241 | Schramm | Oct. 29, 1946 |
| 2,411,009 | Slimp | Nov. 12, 1946 |